United States Patent
Yamasaki et al.

(10) Patent No.: US 11,400,535 B2
(45) Date of Patent: Aug. 2, 2022

(54) METHOD AND DEVICE FOR MANUFACTURING SHAPED OBJECTS

(71) Applicant: KOBE STEEL, LTD., Hyogo (JP)

(72) Inventors: Takemasa Yamasaki, Hyogo (JP); Shinji Sato, Hyogo (JP); Takeshi Yamada, Hyogo (JP); Tatsuya Fujii, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 241 days.

(21) Appl. No.: 16/763,182

(22) PCT Filed: Nov. 6, 2018

(86) PCT No.: PCT/JP2018/041249
§ 371 (c)(1),
(2) Date: May 11, 2020

(87) PCT Pub. No.: WO2019/098097
PCT Pub. Date: May 23, 2019

(65) Prior Publication Data
US 2020/0391316 A1    Dec. 17, 2020

(30) Foreign Application Priority Data
Nov. 15, 2017 (JP) ............... JP2017-220213

(51) Int. Cl.
*B33Y 10/00* (2015.01)
*B33Y 30/00* (2015.01)
(Continued)

(52) U.S. Cl.
CPC ............ *B23K 9/044* (2013.01); *B23K 9/0953* (2013.01); *B23K 9/0956* (2013.01); *B33Y 10/00* (2014.12); *B33Y 30/00* (2014.12); *B33Y 50/02* (2014.12)

(58) Field of Classification Search
CPC ......... B33Y 10/00; B33Y 30/00; B33Y 50/00; B23K 9/04–044; B23K 9/095; B23K 9/0953; B23K 11/0013; B23K 26/34–342
See application file for complete search history.

(56) References Cited

U.S. PATENT DOCUMENTS

2016/0151833 A1* 6/2016 Tsao .................. B23K 9/04
                                                       219/136
2016/0243638 A1* 8/2016 Berube ................ C22C 21/08
(Continued)

FOREIGN PATENT DOCUMENTS

JP         2015-160217 A      9/2015

OTHER PUBLICATIONS

English translation of JP 2015160217 to Sasahara (Year: 2015).*

*Primary Examiner* — Michael A Laflame, Jr.
(74) *Attorney, Agent, or Firm* — Studebaker & Brackett PC

(57) ABSTRACT

A method for producing a built-up object, includes: producing maps beforehand, the maps indicating bead heights BH and bead widths BW corresponding to a base-surface inclination angle θ and a track inclination angle φ, in which the base-surface inclination angle is an angle between a base surface on which the weld beads are to be formed and a vertical direction, and the track inclination angle is an angle between a track direction of the torch and a vertical direction on the base surface; selecting a bead height $BH_0$ and a bead width $BW_0$ from the maps correspondingly to the base-surface inclination angle θ and the track inclination angle φ in forming a weld bead on the base surface; and forming the weld bead based on the selected bead height $BH_0$ and bead width $BW_0$.

12 Claims, 5 Drawing Sheets

(51) Int. Cl.
    *B23K 9/04*         (2006.01)
    *B33Y 50/00*      (2015.01)
    *B23K 9/095*     (2006.01)
    *B33Y 50/02*      (2015.01)

(56)                   References Cited

U.S. PATENT DOCUMENTS

| | | | |
|---|---|---|---|
| 2016/0263833 A1* | 9/2016 | Vittitow | B22F 10/20 |
| 2017/0232518 A1* | 8/2017 | Shi | B22F 3/105 |
| | | | 419/7 |
| 2017/0248937 A1* | 8/2017 | Guimbretiere | G05B 19/4099 |
| 2019/0351509 A1* | 11/2019 | Kay | B23K 9/04 |
| 2020/0180034 A1* | 6/2020 | Dorval Dion | B22F 3/003 |
| 2020/0398363 A1* | 12/2020 | Liu | B23K 9/1093 |
| 2021/0252642 A1* | 8/2021 | Williams | B33Y 30/00 |
| 2021/0402481 A1* | 12/2021 | Stecker | B22F 12/00 |

\* cited by examiner

FIG. 3A
FIG. 3B
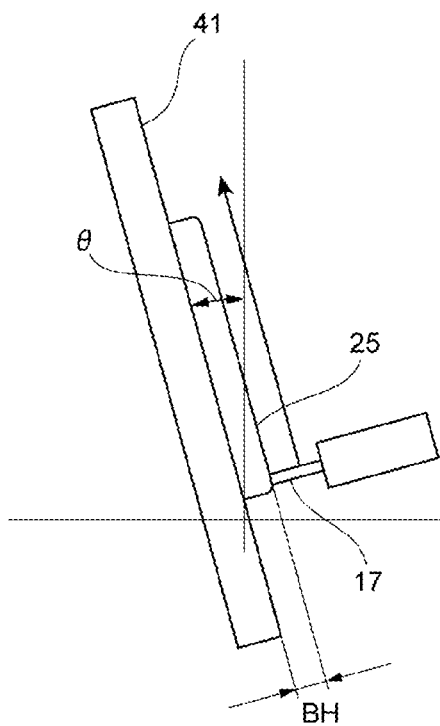
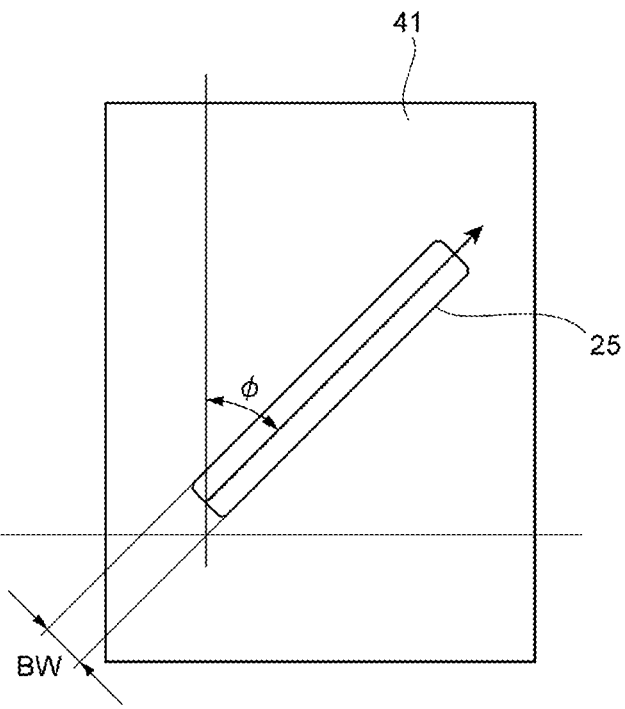

US 11,400,535 B2

METHOD AND DEVICE FOR MANUFACTURING SHAPED OBJECTS

TECHNICAL FIELD

The present invention relates to a method and an apparatus for producing a built-up object.

BACKGROUND ART

In recent years, there is growing need for 3D printers as production means, and researches and developments have been made in the field of airplanes, etc. in order to practically apply 3D printers to, in particular, metallic materials. For example, a 3D printer employing a metallic material melts the metal powder or metal wire using a heat source, such as a laser or an arc, and deposits the molten metal, thereby producing a built-up object.

As a technique for producing such a built-up object, there is a common technique in which in a case where a second weld bead is deposited so as to deviate from the center line of the extension direction of a first weld bead, a parameter for controlling the fed amount of droplets is calculated from the amount of deviation from the center line to control the welding torch and a moving mechanism for moving the welding torch (see, for example, Patent Literature 1).

CITATION LIST

Patent Literature

Patent Literature 1: JP-A-2015-160217

SUMMARY OF INVENTION

Technical Problem

Meanwhile, in a case where a weld bead is formed on a base surface which is inclined, there is a possibility that the weld bead being formed drips due to the influence of gravity. In a case where the travelling speed of the welding torch is heightened in order to avoid the dripping of the weld bead, there is a possibility that humping might occur in which the weld bead breaks.

An object of the present invention is to provide a method and an apparatus for producing a built-up object which are capable of producing a built-up object by efficiently forming weld beads without arousing troubles such as dripping or humping.

Solution to Problem

The present invention includes the following configurations.
(1) A method for producing a built-up object by melting and solidifying a filler metal, thereby forming weld beads with a torch, the method including:
producing maps beforehand, the maps indicating bead heights BH and bead widths BW corresponding to a base-surface inclination angle θ and a track inclination angle φ, in which the base-surface inclination angle is an angle between a base surface on which the weld beads are to be formed and a vertical direction, and the track inclination angle is an angle between a track direction of the torch and a vertical direction on the base surface;
selecting a bead height $BH_0$ and a bead width $BW_0$ from the maps correspondingly to the base-surface inclination angle θ and the track inclination angle φ in forming a weld bead on the base surface; and
forming the weld bead based on the selected bead height $BH_0$ and bead width $BW_0$.
(2) An apparatus for producing a built-up object by melting and solidifying a filler metal to form weld beads, thereby producing the built-up object including the weld beads on a base surface, the apparatus including:
a torch configured to form the weld beads;
a moving mechanism configured to move the torch relatively to the base surface;
a memory unit configured to store maps indicating bead heights and bead widths corresponding to a base-surface inclination angle and a track inclination angle, in which the base-surface inclination angle is an angle between the base surface and the vertical direction and the track inclination angle is an angle between a track direction of the torch and a vertical direction on the base surface; and
a control unit configured to select, in forming a weld bead on the base surface, a bead height and a bead width from the maps in the memory unit correspondingly to the base-surface inclination angle and the track inclination angle, and control the moving mechanism and the torch, thereby forming the weld bead.

Advantageous Effects of Invention

According to the present invention, a built-up object can be produced by efficiently forming weld beads without arousing troubles such as dripping or humping.

BRIEF DESCRIPTION OF DRAWINGS

FIG. 3A and FIG. 3B are views for illustrating how a weld bead is formed;
FIG. 3A is a side view and FIG. 3B is a front view.

DESCRIPTION OF EMBODIMENTS

Embodiments of the present invention are described below in detail by reference to the drawings.

Figure 1:
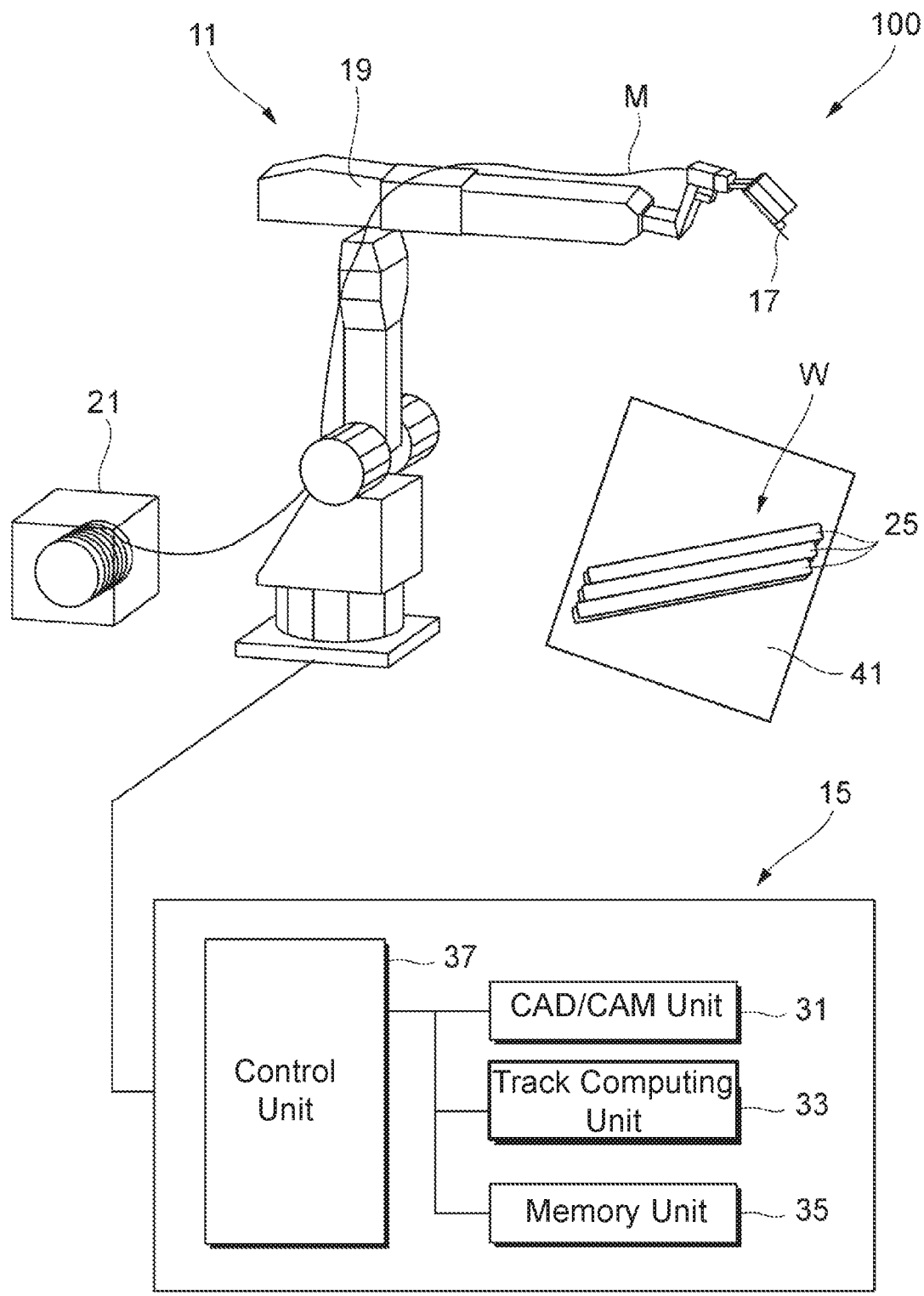
FIG. 1 is a schematic view showing the configuration of a production system for producing a built-up object of the present invention.

FIG. 1 is a schematic view illustrating the configuration of a production system for producing a built-up object of the present invention.

The production system 10 having this configuration includes: an additively manufacturing device 11; and a controller 15 configured to control the whole additively manufacturing device 11.

The additively manufacturing device 11 includes: a welding robot 19 including a torch 17 provided to an end shaft thereof; and a filler-metal feed part 23 configured to feed a filler metal (welding wire) M to the torch 17.

The controller 15 includes: a CAD/CAM unit 31; a track computing unit 33; a memory unit 35; and a control unit 37 to which these units have been connected.

The welding robot 19 is an articulated robot, and the filler metal M is supported by the torch 17 provided to the end shaft, such that the filler metal M can be continuously fed thereto. The position and posture of the torch 17 can be arbitrarily set three-dimensionally within the range over which the robot arm is movable.

The torch 17 includes a shield nozzle (not shown), and a shielding gas is supplied from the shield nozzle. Arc welding to be used in this configuration may be either a consumable-electrode method, such as shielded-metal arc welding or carbon dioxide gas arc welding, or a non-consumable-electrode method, such as TIG welding or plasma arc welding. An appropriate arc welding method is selected depending on the built-up object W to be produced.

For example, in the case of a consumable-electrode method, a contact tip is disposed inside the shield nozzle, and a filler metal M to which a melting current is supplied is held by the contact tip. The torch 17, while holding the filler metal M, generates an arc from the end of the filler metal M in a shielding gas atmosphere. The filler metal M is fed from the filler-metal feed part 23 to the torch 17 by a feeding mechanism (not shown) attached to the robot arm, or the like. The continuously fed filler metal M is melted and solidified while the torch 17 is moved, thereby forming a linear weld bead 25, which is a solid formed by melting and solidifying the filler metal M, on a base plate 41.

Heat sources for melting the filler metal M are not limited to the arc. For example, a method employing other heat source(s), such as a heating method in which an arc and a laser are used in combination, a heating method in which a plasma is used, or a heating method in which an electron beam or a laser is used, may be employed. In the case of heating with an electron beam or a laser, the quantity of applied heat can be more finely controlled to more properly maintain the state of the weld bead, thereby contributing to a further improvement in the quality of the additively-manufactured object.

The CAD/CAM unit 31 produces profile data on the built-up object W to be produced and then divides the profile data into data for each of a plurality of layers to produce layer profile data representing the profile of each layer. The track computing unit 33 determines a movement track for the torch 17 based on the produced layer profile data. The data, including the produced layer profile data and the movement track for the torch 17, are stored in the memory unit 35.

The control unit 37 executes a driving program based on the layer profile data and the movement track for the torch 17, which are stored in the memory unit 35, to operate the welding robot 19.

Figure 2A:
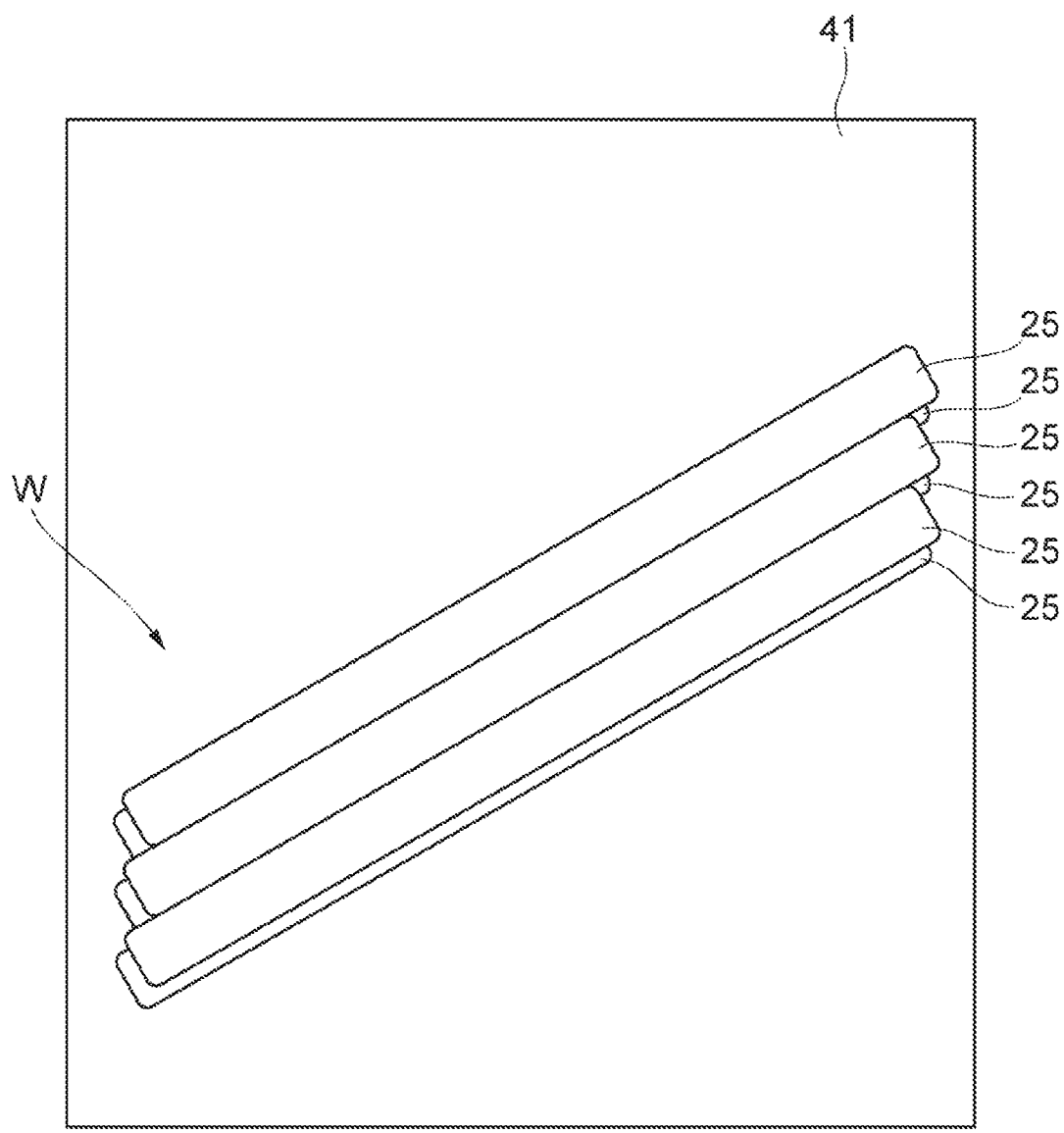
FIG. 2A is a front view of a built-up object produced by depositing weld beads.
Figure 2B:
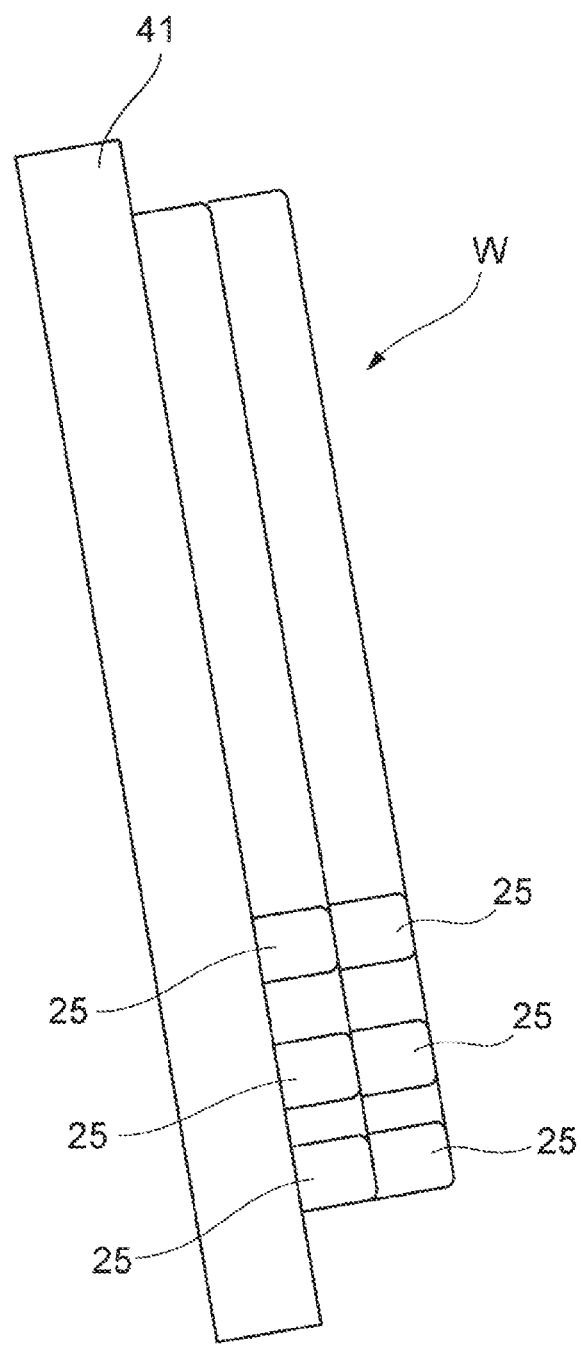
FIG. 2B is a side view of the built-up object produced by depositing weld beads.

The control unit 37 executes a driving program based on the layer profile data and the movement track for the torch 17, which are stored in the memory unit 35, to operate the welding robot 19. That is, the welding robot 19, in accordance with a command from the controller 15, moves the torch 17 while melting the filler metal M with an arc, based on the movement track for the torch 17 produced by the track computing unit 33. FIG. 1 shows how a built-up object W is produced by obliquely disposing a plurality of weld beads 25 on a base plate 41 constituted of a steel plate inclined with respect to the vertical plane, The production system 100 having the configuration described above melts the filler metal M while moving the torch 17 by the welding robot 19 along the movement track for the torch 17 produced from the set layer profile data and feeds the molten filler metal M to the surface of the base plate 41. Thus, for example as illustrated in FIG. 2A and FIG. 2B, a plurality of linear weld beads 25 are formed and obliquely arranged on the base plate 41 inclined with respect to the vertical plane, thereby producing a built-up object W including a plurality of layers of the thus deposited weld beads.

Meanwhile, in a case where a torch 17 is moved obliquely to the vertical direction to form a weld bead 25 on a base plate 41 inclined with respect to the vertical plane as illustrated in FIG. 3A and FIG. 3B, there is a possibility that the weld bead 25 being formed might drip due to the influence of gravity. This gravitational influence is greater as the angle (base-surface inclination angle) θ formed by the base surface, which is the surface of the base plate 41, and the vertical direction becomes smaller, and is greater as the angle (track inclination angle) φ formed by the track direction of the torch 17 and the vertical direction over the base plate 41 becomes larger. In a case where the weld bead 25 being formed thus undergoes a considerable gravitational influence, although the dripping can be inhibited by increasing the travelling speed V of the torch 17, humping in which the weld bead 25 breaks might occur.

Because of this, in this embodiment, the control unit 37 of the controller 15 controls the welding robot 19 and the torch 17 to perform gravitational-influence control for inhibiting the weld beads 25 being formed from dripping or from causing humping. The gravitational-influence control by the control unit 37 is explained below.

The memory unit 35 stores maps produced beforehand. The maps are maps indicating bead heights BH and bead widths BW corresponding to a base-surface inclination angle θ, at which the base plate 41 is inclined with respect to the vertical plane, and a track inclination angle φ, at which the track direction of the torch 17 is inclined with respect to the vertical direction on the base plate 41. The maps are maps indicating data on bead heights BH and bead widths BW for a weld bead 25 which do not cause the weld bead 25 to drip or arouse humping for the base-surface inclination angle θ and track inclination angle φ. The maps have been determined beforehand through experiments, etc. In producing the maps, $\cos θ \sin φ$ is used as an index of a gravitational influence on weld beads 25.

Upon the determination of a movement track for the torch 17 by the track computing unit 33 based on the layer profile data, the control unit 37 selects a bead height BH and a bead width BW for a weld bead 25 depending on the movement track for the torch 17 based on a map stored in the memory unit 35.

The control unit 37 further determines a travelling speed V of the torch 17 and a current value I for arc generation so as to form a weld bead 25 based on the selected bead height BH and bead width BW. The memory unit 35 stores process windows (application ranges) as maps, the process windows indicating travelling speeds V and current values I for each base-surface inclination angle θ.

Figure 4A:
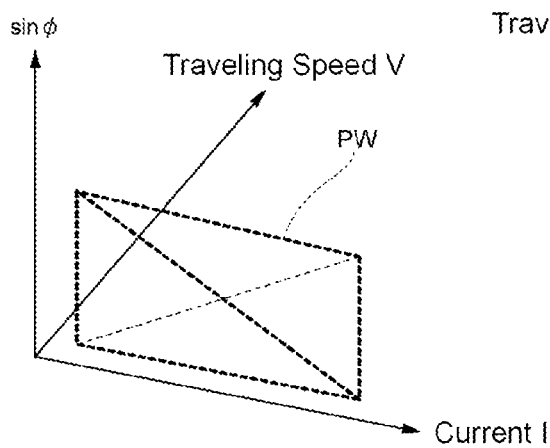
FIG. 4A and FIG. 4B are each a chart showing a process window to be used in forming a weld bead.
Figure 4B:
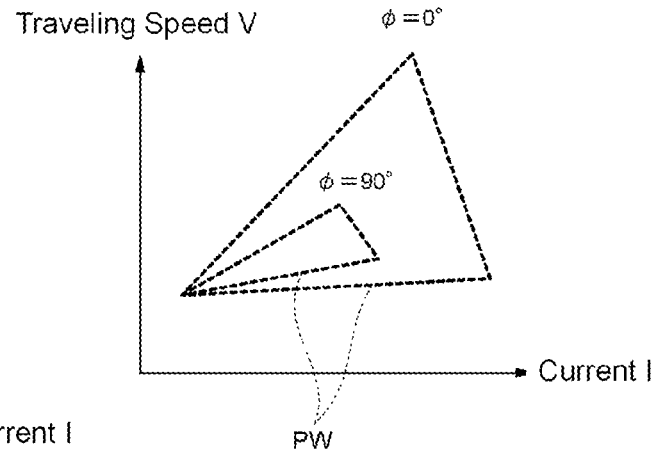

FIG. 4A and FIG. 4B show process windows PW indicating the travelling speed V of the torch 17 and the current value I for arc generation in deposition on a base plate 41 disposed vertically to have a base-surface inclination angle θ of 0°. As FIG. 4A and FIG. 4B show, the process windows PW regarding travelling speed V and current value I gradually become narrower as the track inclination angle φ increases, because the gravitational influence becomes greater.

For example, in a case where the base-surface inclination angle θ is 0°, the control unit 37 applies a movement track inclination angle φ to the process windows PW shown in FIG. 4A and FIG. 4B, thereby determining a travelling speed V of the torch 17 and a current value I for arc generation to form a weld bead 25 based on the selected bead height BH and bead width BW.

After determining the travelling speed V and the current value I, the control unit 37 operates the welding robot 19 to move the torch 17 at the determined travelling speed V and generate an arc at the determined current value I for forming a weld head 25 along the produced movement track. Then, the weld bead 25 is formed on the base plate 41 having the selected bead height BH and bead width BW. Thus, weld beads 25 are formed on the base plate 41 along the produced movement track to produce a built-up object W without causing dripping or humping.

There is a possibility, depending on the shape of the built-up object, etc., that a weld head 25 having sizes different from the bead height BH and bead width BW selected from a map might be unavoidably deposited. In this case, the selected bead height BH and bead width BW can be modified using a map.

In a case where this modification is made by feedback control, the bead height BH and bead width BW are improper as parameters for the control, because the bead height BH and the bead width BW are nothing but desired indexes and are not parameters that can be directly controlled. Meanwhile, base-surface inclination angle θ and track inclination angle φ are parameters which can be regulated to some degree by moving the stage on which the base plate 41 is placed or changing the torch movement direction, etc. Base-surface inclination angle θ and track inclination angle φ are hence used as control parameters to modify the bead height BH and the bead width BW. This modification can be efficiently made by determining information on continuous (or stepwise) changes of cos θ sin φ value beforehand and actively performing feedback control based on the information.

Specifically, as shown in Table 1, when a weld bead is formed under the conditions of a base-surface inclination angle $\theta_0$ and a track inclination angle $\varphi_0$, a bead height $BH_0$ and a bead width $BW_0$ are selected by referring to a map indicating information on the results of actual bead formation. A weld bead is formed using bead formation corresponding to the selected $BH_0$ and $BW_0$, as command values for control. It is assumed that this weld bead is examined after the bead formation and that, as a result, the base-surface inclination angle and track inclination angle for the bead are found to be $\theta_m$ and $\varphi_m$, respectively. It is also assumed that collating the $\theta_m$ and $\varphi_m$ with maps indicates that a weld bead to be actually deposited is expected to have a bead width of $BW_1$ and a bead height of $BH_1$.

In this case, the values of bead sizes $BH_0$ and $BW_0$ which were selected at first are modified such that the size of a weld bead to be actually deposited has the sizes $BW_0$ and $BH_0$ accurately. That is, even when the bead sizes are set at $BH_0$ and $BW_0$ to form a weld bead, the actually deposited weld bead has a bead size different from $BH_0$ and $BW_0$. Hence, the values of $BH_0$ and $BW_0$ which have been selected at first from the map are modified beforehand such that a formed bead has the proper bead sizes ($BH_0$, $B_0$).

Specifically, an actual value $\theta_m$ of base-surface inclination angle θ and an actual value $\varphi_m$ of track inclination angle φ which correspond to a determined shape (bead height and bead width) of a weld bead are determined through a measurement.

Next, a bead height $BH_1$ and a bead width $BW_1$ which correspond to the actual values $\theta_m$ and $\varphi_m$ of base-surface inclination angle θ and track inclination angle φ are determined from the map. Then, the differences $\Delta BH$ (=$BH_0$−$BH_1$) and $\Delta BW$ (=$BW_0$−$BW_1$) from the bead height $BH_0$ and bead width $BW_0$ selected at first are determined.

The determined differences $\Delta BH$ and $\Delta BW$ are added, and maps are searched under the conditions of the resultant bead height $BH_2$ (=$BH_1$+$\Delta BH$) and bead width $BW_2$ (=$BW_1$+$\Delta BW$) to determine values of base-surface inclination angle θ+α and track inclination angle φ+β which correspond to the $BH_2$ and $BW_2$ (α and β are corrected angles).

Then, the command for bead-formation control is modified to a command for depositing a weld bead under the conditions of a base-surface inclination angle of θ+α and a track inclination angle of φ+β. That is, a bead is formed after the first selected bead conditions ($BH_0$, $BW_0$) are changed to the modified values ($BH_2$, $BW_2$)

Thus, the control command can be modified such that a weld bead satisfying the bead height $BH_0$ and bead width $BW_0$ selected from the map prepared beforehand can be actually deposited. The reason why the actual values of bead height and bead width are not evaluated directly through a surface profile measurement during deposition is that it is difficult to evaluate the accurate bead height and bead width of each weld bead from the surface profile thereof during deposition.

For determining the surface profile of a weld bead, for example, a light-section method or the like can be used. In this case, the base-surface inclination angle θ can be precisely determined by determining the profile of the upper surface of weld beads 25 shown in FIG. 2A, even in a case where the base surface is not the surface of the base plate 41 but the upper surface of the weld beads 25. Meanwhile, the track inclination angle φ can be determined from the extension direction of the deposited weld bead, in which the extension direction is determined, for example, by subjecting the weld bead to a three-dimensional profile measurement and extracting highest peaks from the results.

Furthermore, the base-surface inclination angle θ can be grasped with sufficient accuracy by taking an appearance photograph of each deposited bead, such as that shown in FIG. 3A and FIG. 3B, with a camera. Although the upper surface of beads is a base surface in depositing the second and succeeding bead layers, the angle θ thereof can be accurately grasped by the method.

Besides determination by calculation, the track inclination angle φ can be determined, for example, by attaching a laser tracker to the torch.

TABLE 1

| | Base-surface inclination angle θ | Track inclination angle φ | Bead width BW | Bead height BH |
|---|---|---|---|---|
| Bead conditions selected at first | $\theta_0$ | $\varphi_0$ | $BW_0$ | $BH_0$ |
| Bead formation conditions corresponding to actual values $\theta_m$ and $\varphi_m$ | $\theta_m$ | $\varphi_m$ | $BW_1$ | $BH_1$ |
| Bead formation conditions corresponding to feedback results | $\theta_0 + \alpha$ | $\varphi_0 + \beta$ | $BW_2$ | $BH_2$ |

In a case where actual values $\theta_m$ and $\varphi_m$ are grasped beforehand as above, more appropriate profile conditions for a weld bead can be thus selected by taking account of the information.

Furthermore, by regarding either the base-surface inclination angle $\theta$ or the track inclination angle $\varphi$ as a fixed value, a value of $\cos\theta \sin\varphi$ can be grasped by feedback control in a shorter time period.

The method described above is an example of feedback control in which the selection, from a map, of bead conditions satisfying given requirements is redone by taking account of actual values. However, a feedback control may be performed such that welding conditions, etc. are changed so as to be suited to the selected bead conditions.

Specifically, as the value of $\cos\theta \sin\varphi$ becomes large, the weld bead becomes apt to drip due to the gravitational influence. Because of this, in a case where the value of $\cos\theta \sin\varphi$ calculated from values of base-surface inclination angle $\theta$ and track inclination angle $\varphi$ selected from a map is too large, the heat input is reduced to prevent weld-bead dripping. For example, the welding conditions are changed by lowering the welding current or increasing the torch travelling speed.

As explained above, in this embodiment of the method and apparatus for producing a built-up object, a bead height BH and a bead width BW are selected from a map correspondingly to a base-surface inclination angle $\theta$, at which a base surface constituted of the surface of the base plate 41 is inclined with respect to the vertical plane, and with a track inclination angle $\varphi$, at which the track direction of the torch 17 is inclined with respect to the vertical direction on the base surface, and a weld bead 25 is formed based on the selected bead height BH and bead width BW. Consequently, by setting beforehand maps which indicate bead heights BH and bead widths BW that do not cause a weld bead 25 to drip or arouse humping at all the base-surface inclination angles $\theta$ and track inclination angles $\varphi$, the weld bead 25 can be formed while minimizing the occurrence of dripping, humping, etc., even when the base surface on which the weld bead 25 is to be formed is inclined with respect to the vertical plane or when the track direction of the torch 17 is inclined with respect to the vertical direction. Thus, a built-up object W of high quality can be produced with a reduced takt time.

Furthermore, by changing values of bead height BH and bead width BW selected from a map into more proper values using actual values or by controlling the travelling speed V of the torch 17 and the current value I for arc generation, a weld bead 25 can be easily and accurately formed.

In particular, by selecting a bead height BH and a bead width BW from a map in which $\cos\theta \sin\varphi$ is used as an index of a gravitational influence, a weld bead 25 can be smoothly formed while dripping due to gravitational influence is inhibited.

The present invention is not limited to the embodiments described above, and the combination of configurations of the embodiments with each other or the modification or application by a person skilled in the art based on the statements in the description and common techniques are also expected in the present invention and are included in the claimed range.

For example, although the surface of the base plate 41 was used as a base surface to form weld beads 25 thereon in the embodiments described above, the base surface on which weld beads 25 are to be formed is not limited to a plate body such as the base plate 41. For example, in a case where layers of weld beads 25 are deposited, the upper surface of the underlying-layer weld beads 25 is a base surface.

For example, although the lamination manufacturing device 11 having this configuration employs a welding robot 19 as the moving mechanism, the moving mechanism is not limited thereto, and a configuration capable of moving the torch 17 relatively to the base plate 41 may be employed. In this case, the term "track for the torch 17" means a track of a relative movement of the torch 17 with respect to the base plate 41.

As described above, the following matters are disclosed in this description.

(1) A method for producing a built-up object by melting and solidifying a filler metal, thereby forming weld beads with a torch, the method including:

producing maps beforehand, the maps indicating bead heights BH and bead widths BW corresponding to a base-surface inclination angle $\theta$ and a track inclination angle $\varphi$, in which the base-surface inclination angle is an angle between a base surface on which the weld beads are to be formed and a vertical direction, and the track inclination angle is an angle between a track direction of the torch and a vertical direction on the base surface;

selecting a bead height $BH_0$ and a bead width $BW_0$ from the maps correspondingly to the base-surface inclination angle $\theta$ and the track inclination angle $\varphi$ in forming a weld bead on the base surface; and forming the weld bead based on the selected bead height $BH_1$ and bead width $BW_0$.

In this method for producing a built-up object, a bead height $BH_0$ and a bead width $BW_0$ are selected from maps correspondingly to a base-surface inclination angle $\theta$, at which the base surface is inclined with respect to the vertical plane, and to a track inclination angle $\varphi$, at which the track direction of the torch is inclined with respect to the vertical direction on the base plane, and a weld bead is formed based on the selected bead height $BH_0$ and bead width $BW_0$. Consequently, by setting beforehand maps which indicate bead heights $BH_0$ and bead widths $BW_0$ that do not cause a weld bead to drip or arouse humping at all the base-surface inclination angles $\theta$ and track inclination angles $\varphi$, the weld bead can be formed while minimizing the occurrence of dripping, humping, etc., even when the base surface on which the weld bead is formed is inclined with respect to the vertical plane or when the track direction of the torch is inclined with respect to the vertical direction. Thus, a built-up object of high quality can be produced with a reduced take time.

(2) The method for producing a built-up object according to (1), the method including:

measuring a surface profile of an already deposited weld bead before the formation of the weld bead, thereby determining an actual value $\theta_m$ of the base-surface inclination angle and an actual value $\varphi_m$ of the track inclination angle, the actual values $\theta_m$ and $\varphi_m$ corresponding to the bead height $BH_0$ and the bead width $BW_0$;

calculating a corresponding bead height $BH_1$ and a corresponding bead width $BW_1$ which correspond to the actual values $\theta_m$ and $\varphi_m$ from the maps;

determining the difference $BH_0$–$BH_1$ between the bead height $BH_0$, which has been selected in forming the weld bead, and the corresponding bead height $BH_1$, and the difference $BW_0$–$BW_1$ between the bead width $BW_0$, which has been selected in forming the weld bead, and the corresponding bead width $BW_1$;

adding the determined differences respectively to the bead height $BH_0$ and the bead width $BW_0$, thereby determining a corrected bead height $BH_2$, and a corrected bead width $BW_2$, determining a corrected base-surface inclination angle θ and a corrected track inclination angle φ which respectively correspond to the corrected bead height $BH_2$ and the corrected bead width $BW_2$ from the maps; and forming the weld bead based on the determined corrected base-surface inclination angle θ and corrected track inclination angle φ.

In this method for producing a built-up object, since a bead height and a bead width are modified such that the base-surface inclination angle and the track inclination angle are close to those for a weld bead which has been actually deposited, a weld bead having an appropriate profile can be formed while inhibiting dripping and humping.

(3) The method for producing a built-up object according to (1) or (2), in which in melting and solidifying the filler metal with an arc to form the weld bead, a travelling speed of the torch and a current value for generating the arc are controlled, thereby forming the weld bead based on the bead height and bead width selected from the maps.

In this method for producing a built-up object, a weld bead can be easily and accurately formed based on a bead height and a bead width which have been selected from the maps by controlling the torch travelling speed and the current value for arc generation.

(4) The method for producing a built-up object according to any one of (1) to (3), including depositing the weld beads, thereby forming the built-up object.

In this method for producing a built-up object, a built-up object configured of deposited layers of weld beads can be produced without arousing any trouble such as dripping or humping.

(5) The method for producing a built-up object according to any one of (1) to (4), in which in producing the maps, relationships of the bead height BH and the bead width BW with respect to the base-surface inclination angle θ and the track inclination angle φ are determined using $\cos θ \sin φ$ as an index of a gravitational influence on the weld bead.

In this method for producing a built-up object, since a bead height and a bead width are selected from maps obtained using $\cos θ \sin φ$ as an index to gravitational influence to form a weld bead, it is possible to smoothly form the weld bead while inhibiting the dripping thereof due to the gravitational influence.

(6) The method for producing a built-up object according to (5), the method including:

measuring a surface profile of an already deposited weld bead before the formation of the weld bead, thereby determining an actual value $θ_m$ of the base-surface inclination angle and an actual value $φ_m$ of the track inclination angle;

calculating a value of $\cos θ_m \sin φ_m$ before the formation of the weld bead; and performing a feedback control of reducing a heat input for the weld bead in a case where the calculated value of $\cos θ_m \sin φ_m$ is larger than a value of $\cos θ \sin φ$ calculated from the base-surface inclination angle θ and track inclination angle φ having been selected from the maps.

In this method for producing a built-up object, since the heat input is reduced, for example, by regulating the welding current or the torch speed so as to be suited to the selected bead conditions, an appropriate bead profile can be obtained while inhibiting dripping and humping.

(7) An apparatus for producing a built-up object by melting and solidifying a filler metal to form weld beads, thereby producing the built-up object including the weld beads on a base surface, the apparatus including:

a torch configured to form the weld beads;

a moving mechanism configured to move the torch relatively to the base surface;

a memory unit configured to store maps indicating bead heights and bead widths corresponding to a base-surface inclination angle and a track inclination angle, in which the base-surface inclination angle is an angle between the base surface and the vertical direction and the track inclination angle is an angle between a track direction of the torch and a vertical direction on the base surface; and a control unit configured to select, in forming a weld bead on the base surface, a bead height and a bead width from the maps in the memory unit correspondingly to the base-surface inclination angle and the track inclination angle, and control the moving mechanism and the torch, thereby forming the weld bead.

In this apparatus for producing a built-up object, the control unit selects a bead height and a bead width for a weld bead to be formed, from the maps stored in the memory unit, the maps indicating bead heights and bead widths according to a base-surface inclination angle, at which the base surface is inclined with respect to the vertical plane, and to a track inclination angle, at which the track direction of the torch is inclined with respect to the vertical direction on the base surface. The control unit then controls the moving mechanism and the torch to form the weld bead based on the selected bead height and bead width. Consequently, by setting beforehand maps which indicate bead heights and bead widths that do not cause a weld bead to drip or arouse humping at all the base-surface inclination angles and track inclination angles, the weld bead can be formed while minimizing the occurrence of dripping, humping, etc., even when the base surface on which the weld bead is formed is inclined with respect to the vertical plane or when the track direction of the torch is inclined with respect to the vertical direction. Thus, a built-up object of high quality can be produced with a reduced takt time.

(8) The apparatus for producing a built-up object according to (7), in which the control unit is configured to control, in forming the weld bead by melting and solidifying the filler metal with an arc, a travelling speed of the torch and a current value for generating the arc, such that the weld bead is formed based on the bead height and bead width selected from the maps.

With this apparatus for producing a built-up object, since the control unit controls the torch travelling speed and the current value for arc generation, a weld bead can be easily and accurately formed based on the bead height and bead width selected from the maps.

(9) The apparatus for producing a built-up object according to (7) or (8), in which in the maps, relationships of the bead height and the bead width with respect to the base-surface inclination angle θ and the track inclination angle φ are determined using $\cos θ \sin φ$ as an index of a gravitational influence on the weld bead.

With this apparatus for producing a built-up object, a weld bead inhibited from dripping can be smoothly formed.

This application is based on Japanese patent application No. 2017-220213 filed on Nov. 15, 2017, the contents thereof being incorporated herein by reference.

REFERENCE SIGNS LIST

11 Lamination manufacturing device (production device
17 Torch
19 Welding robot (moving mechanism)
25 Weld bead
35 Memory unit 37 Control unit
BH Bead height
BW Bead width
I Current value
M Filler metal
V travelling speed
W Built-up object
θ Base-surface inclination angle
φ Track inclination angle

The invention claimed is:

1. A method for producing a built-up object by melting and solidifying a filler metal, thereby forming weld beads with a torch, the method comprising:
producing maps beforehand, each of the maps indicating a bead height BH and a bead width BW corresponding to a base-surface inclination angle θ and a track inclination angle φ, wherein the base-surface inclination angle is an angle between a base surface on which the weld beads are to be formed and a vertical direction, and the track inclination angle is an angle between a track direction along which the torch moves on the base surface and a vertical direction;
selecting a bead height $BH_0$ and a bead width $BW_0$ from one of the maps correspondingly to the base-surface inclination angle θ and the track inclination angle φ in forming a weldbead on the base surface; and
forming the weld bead based on the selected bead height $BH_0$ and bead width $BW_0$.

2. The method for producing a built-up object according to claim 1, the method comprising:
measuring a surface profile of an already deposited weld bead before the formation of the weld bead, thereby determining an actual value $θ_m$ of the base-surface inclination angle and an actual value $φ_m$ of the track inclination angle, the actual values $θ_m$ and $φ_m$ corresponding to the bead height $BH_0$ and the bead width $BW_0$;
calculating a corresponding bead height $BH_1$ and a corresponding bead width $BW_1$ which correspond to the actual values $θ_m$ and $φ_m$ from the maps;
determining the difference $BH_0$-$BH_1$ between the bead height $BH_0$, which has been selected in forming the weld bead, and the corresponding bead height $BH_1$, and the difference $BW_0$-$BW_1$ between the bead width $BW_0$, which has been selected in forming the weld bead, and the corresponding bead width $BW_1$;
adding the determined differences respectively to the bead height $BH_0$ and the bead width $BW_0$, thereby determining a corrected bead height $BH_2$ and a corrected bead width $BW_2$,
determining a corrected base-surface inclination angle θ and a corrected track inclination angle φ which respectively correspond to the corrected bead height $BH_2$ and the corrected bead width $BW_2$ from the maps; and
forming the weld bead based on the determined corrected base-surface inclination angle θ and corrected track inclination angle φ.

3. The method for producing a built-up object according to claim 1, wherein in melting and solidifying the filler metal with an arc to form the weld bead, a travelling speed of the torch and a current value for generating the arc are controlled, thereby forming the weld bead based on the bead height and bead width selected from the maps.

4. The method for producing a built-up object according to claim 2, wherein in melting and solidifying the filler metal with an arc to form the weld bead, a travelling speed of the torch and a current value for generating the arc are controlled, thereby forming the weld bead based on the bead height and bead width selected from the maps.

5. The method for producing a built-up object according to claim 1, comprising depositing the weld beads, thereby forming the built-up object.

6. The method for producing a built-up object according to claim 1, wherein in producing the maps, relationships of the bead height BH and the bead width BW with respect to the base-surface inclination angle θ and the track inclination angle φ are determined using cos θ sin φ as an index of a gravitational influence on the weld bead.

7. The method for producing a built-up object according to claim 5, wherein in producing the maps, relationships of the bead height BH and the bead width BW with respect to the base-surface inclination angle θ and the track inclination angle φ are determined using cos θ sin φ as an index of a gravitational influence on the weld bead.

8. The method for producing a built-up object according to claim 6, the method comprising:
measuring a surface profile of an already deposited weld bead before the formation of the weld bead, thereby determining an actual value $θ_m$ of the base-surface inclination angle and an actual value $φ_m$ of the track inclination angle;
calculating a value of $\cos θ_m \sin φ_m$ before the formation of the weld bead; and
performing a feedback control of reducing a heat input for the weld bead in a case where the calculated value of $\cos θ_m \sin φ_m$ is larger than a value of cos θ sin φ calculated from the base-surface inclination angle θ and track inclination angle φ having been selected from the maps.

9. The method for producing a built-up object according to claim 7, the method comprising:
measuring a surface profile of an already deposited weld bead before the formation of the weld bead, thereby determining an actual value $θ_m$ of the base-surface inclination angle and an actual value $φ_m$ of the track inclination angle;
calculating a value of $\cos θ_m \sin φ_m$ before the formation of the weld bead; and
performing a feedback control of reducing a heat input for the weld bead in a case where the calculated value of $\cos θ_m \sin φ_m$ is larger than a value of cos θ sin φ calculated from the base-surface inclination angle θ and track inclination angle φ having been selected from the maps.

10. An apparatus for producing a built-up object by melting and solidifying a filler metal to form weld beads, thereby producing the built-up object including the weld beads on a base surface, the apparatus comprising:
a torch configured to form the weld beads;
a moving mechanism configured to move the torch relatively to the base surface;
a memory unit configured to store maps, each map indicating a bead height and a bead width corresponding to a base-surface inclination angle and a track inclination angle, wherein the base-surface inclination angle is an angle between the base surface and the vertical direction and the track inclination angle is an angle between a track direction along which the torch moves on the base surface and a vertical direction; and
a control unit configured to select, in forming a weld bead on the base surface, a bead height and a bead width from one of the maps in the memory unit correspondingly to the base-surface inclination angle and the track inclination angle, and control the moving mechanism and the torch, thereby forming the weld bead.

11. The apparatus for producing a built-up object according to claim 10, wherein the control unit is configured to control, in forming the weld bead by melting and solidifying the filler metal with an arc, a travelling speed of the torch and a current value for generating the arc, such that the weld bead is formed based on the bead height and bead width selected from the maps.

12. The apparatus for producing a built-up object according to claim 10, wherein in the maps, relationships of the bead height and the bead width with respect to the base-surface inclination angle $\theta$ and the track inclination angle $\varphi$ are determined using $\cos \theta \sin \varphi$ as an index of a gravitational influence on the weld bead.

* * * * *